United States Patent
Tao

(10) Patent No.: US 9,668,019 B2
(45) Date of Patent: May 30, 2017

(54) ELECTRONIC SYSTEM WITH ADAPTIVE ENHANCEMENT MECHANISM AND METHOD OF OPERATION THEREOF

(71) Applicant: Samsung Electronics Co., Ltd., Suwon-si, Gyeonggi-Do (KR)

(72) Inventor: Li Tao, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/211,644

(22) Filed: Mar. 14, 2014

(65) Prior Publication Data

US 2014/0282809 A1    Sep. 18, 2014

Related U.S. Application Data

(60) Provisional application No. 61/794,627, filed on Mar. 15, 2013, provisional application No. 61/892,391, filed on Oct. 17, 2013.

(51) Int. Cl.
| | |
|---|---|
| *H04N 21/4402* | (2011.01) |
| *H04N 19/176* | (2014.01) |
| *H04N 19/146* | (2014.01) |
| *H04N 19/48* | (2014.01) |
| *H04N 19/44* | (2014.01) |
| *H04N 19/85* | (2014.01) |
| *H04N 19/59* | (2014.01) |

(52) U.S. Cl.
CPC ... *H04N 21/440263* (2013.01); *H04N 19/146* (2014.11); *H04N 19/176* (2014.11); *H04N 19/44* (2014.11); *H04N 19/48* (2014.11); *H04N 19/59* (2014.11); *H04N 19/85* (2014.11); *H04N 21/440218* (2013.01)

(58) Field of Classification Search
CPC ............ H04N 13/0029; H04N 13/04; H04N 19/00072; H04N 19/0009; H04N 19/00812; H04N 21/440218; H04N 21/440263
USPC ........................................ 725/134
See application file for complete search history.

(56) References Cited

U.S. PATENT DOCUMENTS

| | | | |
|---|---|---|---|
| 6,343,098 B1* | 1/2002 | Boyce | 375/240.03 |
| 2003/0138150 A1* | 7/2003 | Srinivasan | H04N 19/136 382/238 |
| 2006/0159369 A1* | 7/2006 | Young | G06T 3/4069 382/299 |

(Continued)

FOREIGN PATENT DOCUMENTS

| | | |
|---|---|---|
| EP | 2362653 A1 | 8/2011 |
| JP | 2008538058 A | 10/2008 |
| JP | 2009147759 A | 7/2009 |

OTHER PUBLICATIONS

European Application No. 14763285, European Patent Office, Extended European Search Report, dated completed Jul. 1, 2016, date issued Jul. 12, 2016.

*Primary Examiner* — Benjamin R Bruckart
*Assistant Examiner* — Susan X Li
(74) *Attorney, Agent, or Firm* — IP Investment Law Group

(57) ABSTRACT

An electronic system includes: a communication unit configured to provide a transport stream; a storage unit, coupled to the communication unit, configured to provide a stream from the transport stream; and a control unit, coupled to the storage unit, configured to restore details to the stream by a compression adaptive module for a high resolution output.

20 Claims, 12 Drawing Sheets

(56) References Cited

U.S. PATENT DOCUMENTS

| | | |
|---|---|---|
| 2009/0003458 A1 | 1/2009 | Au et al. |
| 2009/0046995 A1* | 2/2009 | Kanumuri et al. .......... 386/114 |
| 2009/0067491 A1 | 3/2009 | Sun et al. |
| 2009/0238535 A1 | 9/2009 | Robertson et al. |
| 2010/0060727 A1 | 3/2010 | Steinberg et al. |
| 2010/0272184 A1 | 10/2010 | Fishbain et al. |
| 2012/0044990 A1 | 2/2012 | Bivolarsky et al. |
| 2012/0137335 A1* | 5/2012 | Yun et al. ...................... 725/93 |
| 2012/0294365 A1* | 11/2012 | Zheng et al. ............ 375/240.16 |
| 2013/0230096 A1* | 9/2013 | Lasserre ............. H04N 19/176 375/240.02 |

\* cited by examiner

ELECTRONIC SYSTEM WITH ADAPTIVE ENHANCEMENT MECHANISM AND METHOD OF OPERATION THEREOF

CROSS-REFERENCE TO RELATED APPLICATIONS

This application claims the benefit of U.S. Provisional Patent Application Ser. No. 61/794,627 filed Mar. 15, 2013 and U.S. Provisional Patent Application Ser. No. 61/892,391 filed Oct. 17, 2013, and the subject matter thereof are incorporated herein by reference thereto.

TECHNICAL FIELD

An embodiment of the present invention relates generally to an electronic system, and more particularly to a system for enhancement.

BACKGROUND

Modern consumer and industrial electronics, especially devices such as graphical display systems, televisions, projectors, cellular phones, portable digital assistants, and combination devices, are providing increasing levels of functionality to support modern life including three-dimensional display services. Research and development in the existing technologies can take a myriad of different directions.

Ultra high definition televisions (UDTV or UHDTV) are currently commercially available in market while ultra high definition (UD or UHD) video is not readily available for viewers to watch. Especially for web videos, the typical quality is still standard definition (SD), full high definition (FHD), or even lower resolution. When UDTV users try to watch web videos, the image quality of SD or FHD frames will look dramatically degraded when displayed on UDTVs. Two factors for the degraded display are compression and lower resolution of the samples than the display resolution. Compression sweeps away details and regular image upscaling or interpolation is unable to provide sufficient image sharpness and fine detail. Typically the resulting display looks blurry due to loss of the fine image details at least because of those two factors.

At the same time, there is a significant lack of HD video content where the majority of TV channels and DVD movies are encoded with standard-definition (SD). Displaying SD video on HD or Ultra High Definition displays can result in poor images. Often images suffer from significant degradation of image quality particularly with compressed image data and lower frequency image data. Some poor images suffer from artifacts at the block boundaries and propagation of accumulated noise.

Thus, a need still remains for an electronic system with adaptive enhancement mechanism to display three-dimensional images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including a communication unit configured to provide a transport stream; a storage unit, coupled to the communication unit, configured to provide a stream from the transport stream; and a control unit, coupled to the storage unit, configured to restore details to the stream by a compression adaptive module for a high resolution output.

An embodiment of the present invention provides a method of operation of an electronic system including: acquiring a transport stream; providing a stream from the transport stream; and restoring, with a control unit, details to the stream by a compression adaptive module for a high resolution output.

An embodiment of the present invention provides a non-transitory computer readable medium including stored thereon instructions to be executed by a control unit including: acquiring a transport stream; providing a stream from the transport stream; and restoring details to the stream by a compression adaptive module for a high resolution output.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
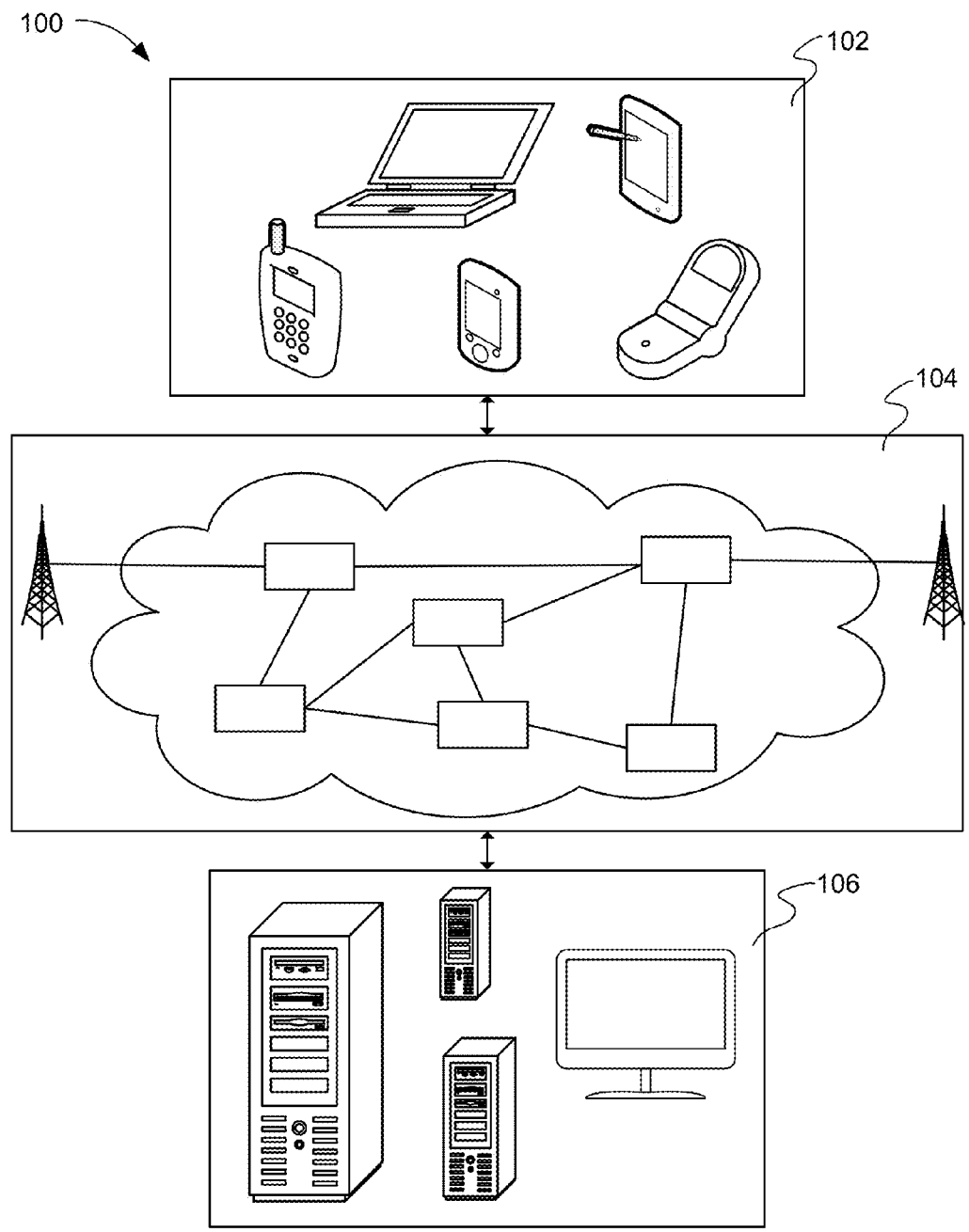
FIG. 1 is an electronic system with adaptive enhancement mechanism in an embodiment of the present invention.

An embodiment of the present invention includes connecting and downloading video streams. The video streams are extracted and delivered to a video decoder, which decodes and sends the video streams to an up-sampler and extracts compression related information embedded in the video stream. The up-sampled input videos are fed into Compression Adaptive Detail Creation (CADC) with the extracted compression information. The CADC restores lost details in an adaptive way based on frequency lifting based super-resolution technology, which controls the frequency lifting with the compression information.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which image information is expressed is not critical to some embodiments of the invention. For example, in some embodiments, image information is presented in the format of (X, Y); where X and Y are two coordinates that define the location of a pixel in an image.

In an alternative embodiment, three-dimensional image information is presented by a format of (X, Y, Z) with related information for color of the pixel. In a further embodiment of the present invention, the three-dimensional image information also includes an intensity or brightness element.

The term "image" referred to herein can include a two-dimensional image, three-dimensional image, video frame, a computer file representation, an image from a camera, a video frame, or a combination thereof. For example, the image can be a machine readable digital file, a physical photograph, a digital photograph, a motion picture frame, a video frame, an x-ray image, a scanned image, or a combination thereof.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with adaptive enhancement mechanism in an embodiment of the present invention. The electronic system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, a liquid crystal display (LCD) system, a light emitting diode (LED) system, or other multi-functional display or entertainment device. The first device 102 can couple, either directly or indirectly, to the communication path 104 to communicate with the second device 106 or can be a stand-alone device.

For illustrative purposes, the electronic system 100 is described with the first device 102 as a display device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, an ultra high definition television, a three dimensional television, a smart television, a computer monitor, a personal digital assistant, a cellular phone, or a multi-media set.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, a television, a high definition television, an ultra high definition television, a smart television, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the electronic system 100 is described with the second device 106 as a computing device, although it is understood that the second device 106 can be different types of devices. Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
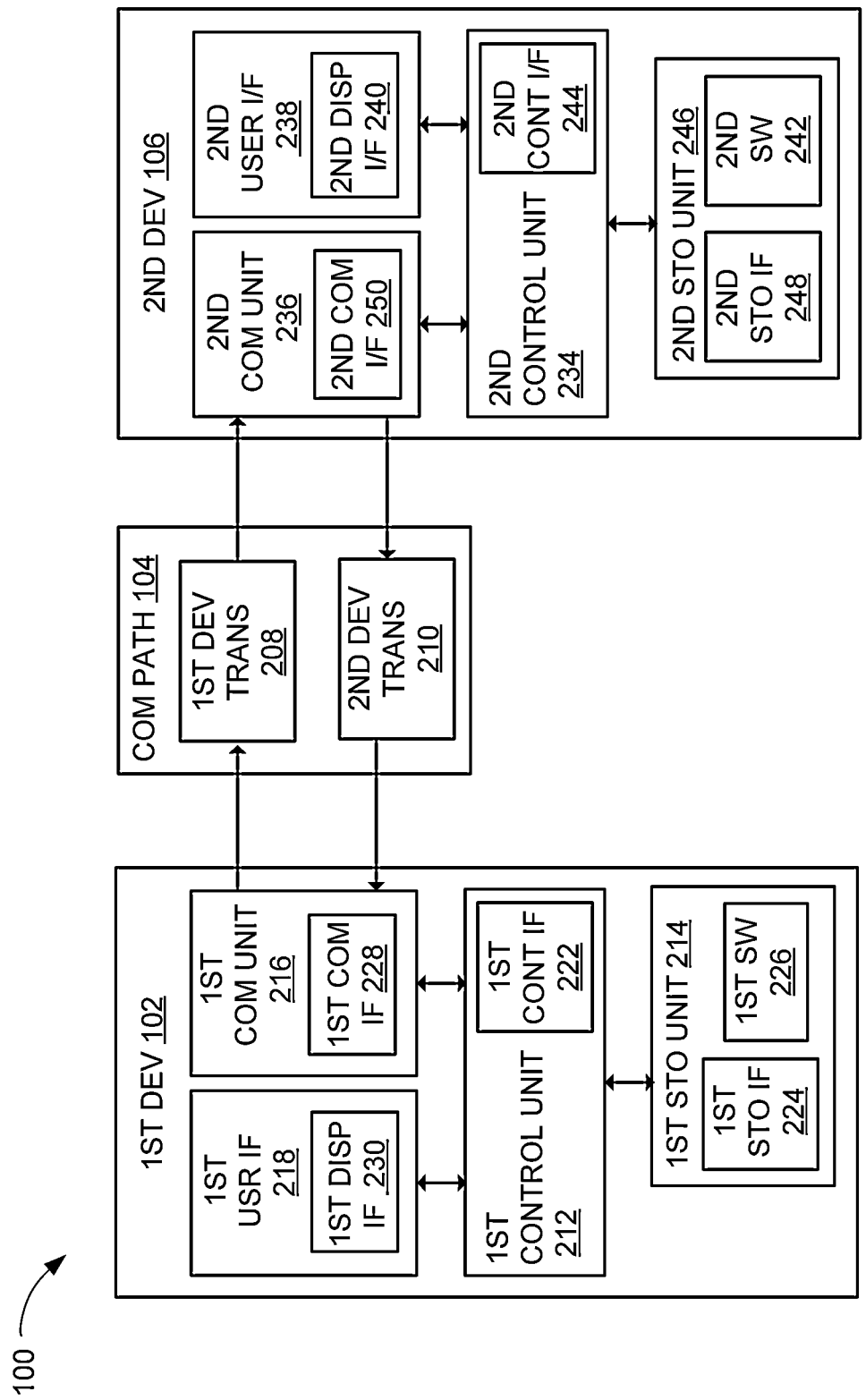
FIG. 2 is an exemplary block diagram of the electronic system.

Referring now to FIG. 2, therein is shown an exemplary block diagram of the electronic system 100. The electronic system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the electronic system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a computer desktop, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the electronic system 100. The first control unit 212 can also execute the first software 226 for the other functions of the electronic system 100. The first control unit 212 can further execute the first software 226 for interaction with the communication path 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows a user (not shown) to interface and interact with the second device 106. The second user interface 238 can include an input device and an output device. Examples of the input device of the second user interface 238 can include a keypad, a touchpad, softkeys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the electronic system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the electronic system 100, including operating the second communication unit 236 to communicate with the first device 102 over the communication path 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the electronic system 100 is shown with the second storage unit 246 as a single hierarchy storage system, although it is understood that the electronic system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The electronic system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100.

Figure 3:
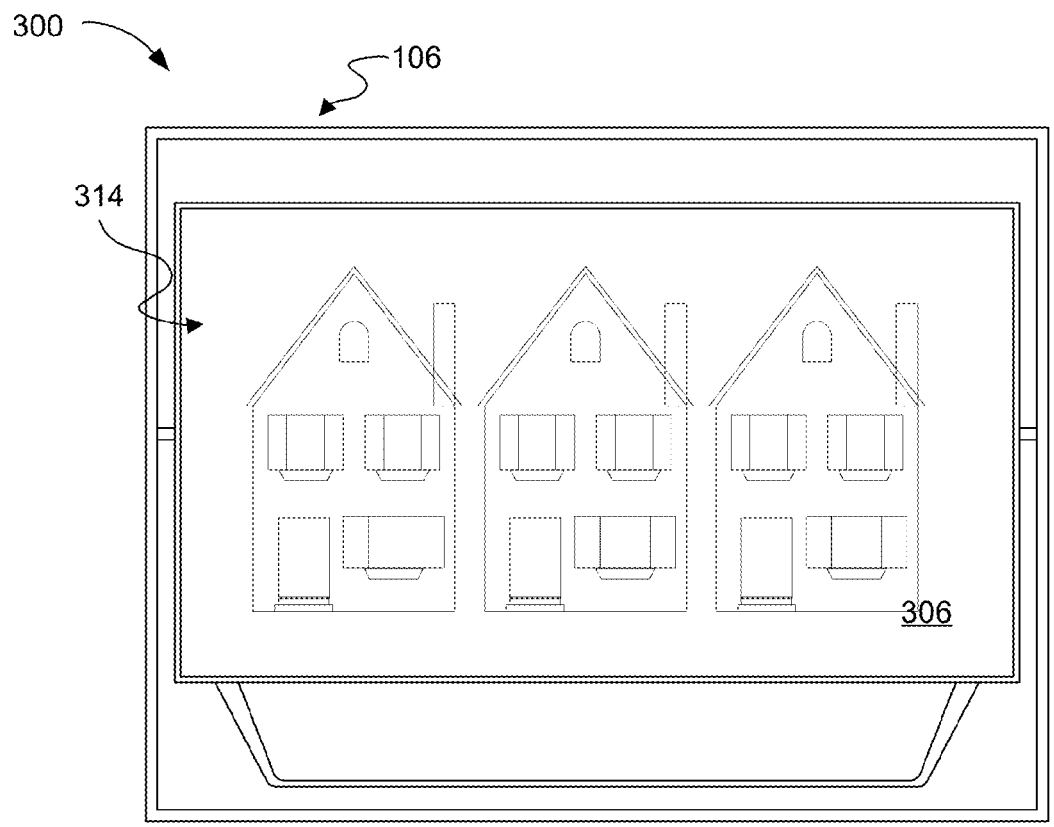
FIG. 3 is an example of display interfaces of the electronic system.
Figure 3:
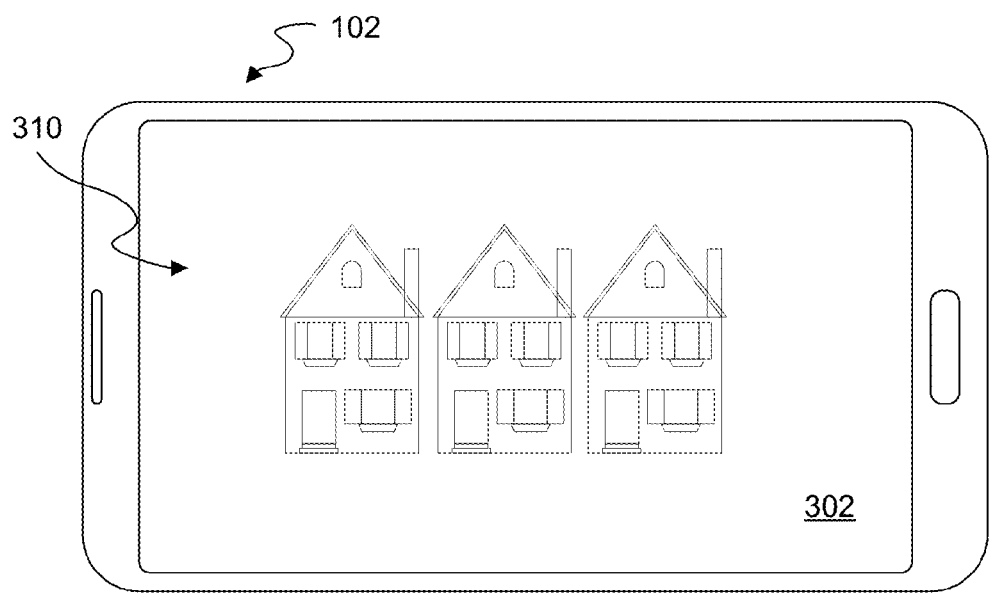

Referring now to FIG. 3, therein is shown an example of display interfaces of the electronic system 100. A first display interface 302 can be included in the first device 102 of FIG. 1, the second device 106 of FIG. 1, or combination thereof. Similarly a second display interface 306 can also be included in the second device 106 of FIG. 1, the first device 102 of FIG. 1, or combination thereof. The first device 102 can display a first image 310. Similarly, the second device can display a second image 314. For example, the first image 310 and the second image 314 can represent a same content displayed at different resolutions.

The first display interface 302, the second display interface 306, or combination thereof can provide Ultra High Definition (UD) output with Full High Definition (FHD) input or Standard Definition (SD) input. For example, 4K UDTV can include 3840 pixels by 2160 pixels with four times the resolution of FHDTV of 1920 pixels×1080 pixels, and 8K UDTV can include 7680 pixels by 4320 pixels with eight times the resolution of FHDTV. For illustrative purposes, the first device 102 has a shape of a smart phone although it is understood that the first device 102 may be any device. Further for illustrative purposes, the second device 106 has a shape of a UDTV although it is understood that the second device 106 may be any device.

The first display interface 302, the second display interface 306, or combination thereof can display an image, text, a symbol, or combination thereof. The image, the text, or the symbol can represent content including video, photos, drawings, or combination thereof. Objects including the image, the text, or the symbol can optionally be radio buttons, selectable, clickable, static, or combination thereof. The content represented by the objects, specific to preferences, selections, viewing time, or combination thereof, can preferably include links to other pages in the same other documents, web sites, web pages, pages in the same document, context, application, or ecosystem.

Selecting, clicking, or activating, the objects preferably provides navigation or access to related content. The symbols can also be consistent with the related content and can change dynamically based on the related content, selection, activation, or combination thereof. For example, different size, shape, color, configuration, or combination thereof, can distinguish the symbol for playing content, the symbol for getting more information, the symbols for buying a service, or the symbols for buying a product.

For illustrative purposes, the first display interface 302 and the second display interface 306 are described with the objects that can selected, clicked, or activated for navigation or access to related content although it is understood that hands free activation or navigation such as contextually relevant speech controls may also be used. Similarly, a user of the content may designate content to be read aloud in a predefined language.

Figure 4:
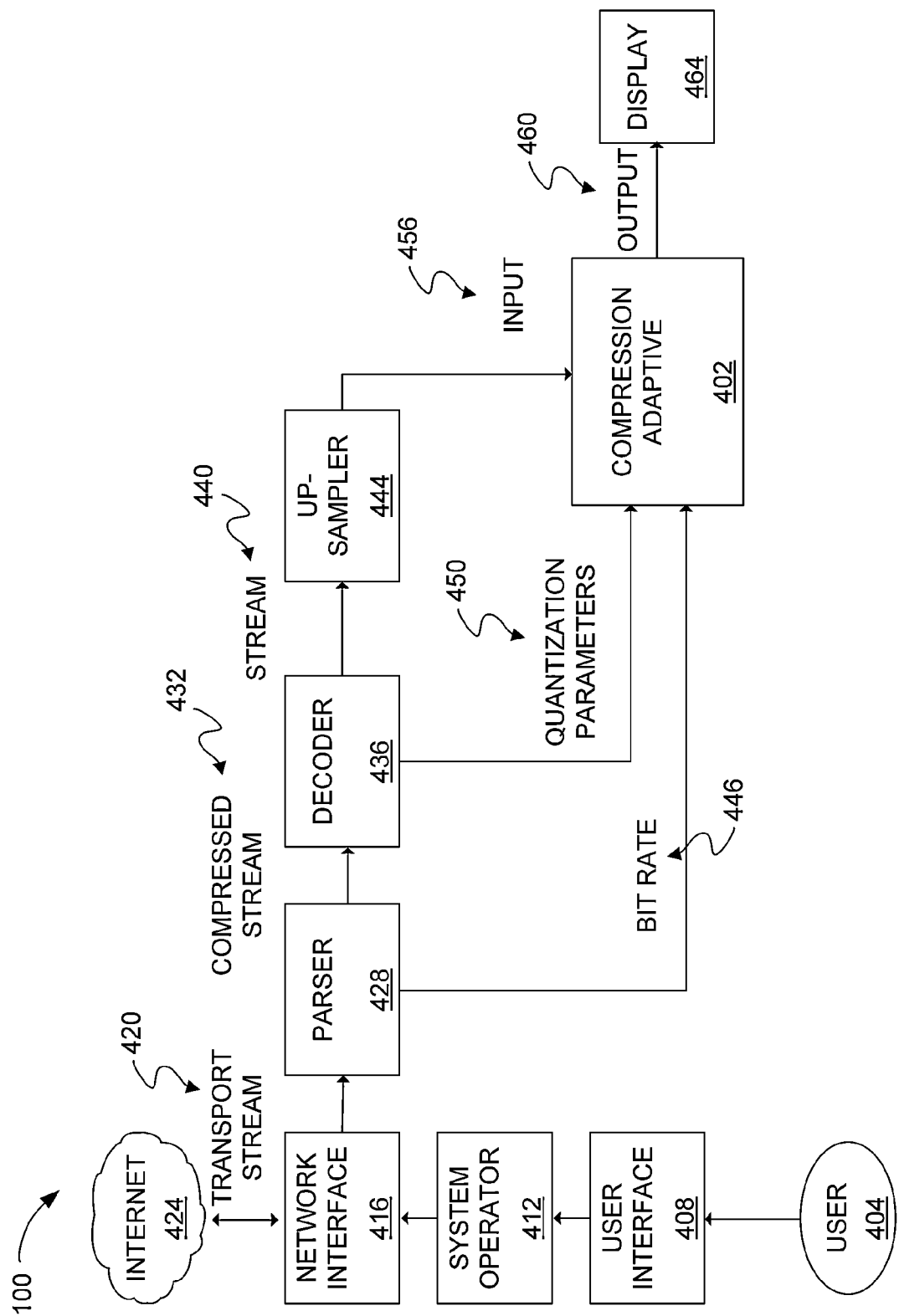
FIG. 4 is an exemplary control flow of the electronic system.

Referring now to FIG. 4, therein is shown an exemplary control flow 400 of the electronic system 100. The control flow 400 includes a compression adaptive module 402. The compression adaptive module 402, such as a Compression Adaptive Detail Creation (CADC) module, can restore details such as image details lost due to compression in an adaptive manner based on frequency lifting frequency lifting controlled with compression information.

A user command 404 can be provided, processed, interpreted, translated, mapped, or combination thereof, with a user interface module 408 for a system operator module 412. A network interface module 416 can also provide, acquire, access, process, interpret, translate, map, or combination thereof, a transport stream 420 from an internet module 424 to the system operator module 412 based on the user command 404.

The system operator module 412 can provide the transport stream 424 to a stream parser module 428 such as a Video Stream Parser. The stream parser module 428 can extract or parse the transport stream 424 for a compressed stream 432 such as a compressed video stream 432. A decoder module 436, such as an H.264 decoder, an MPEG decoder, any other decoder, or combination thereof, can receive, process, decode, or combination thereof, the compressed stream 432. The decoder module 436 provides a stream 440 such as a video stream, an audio stream, a multimedia stream, any other stream, or combination thereof, to the up-sampler module 444.

The decoder module 436 also extracts compression information, such as compression related information embedded in the compressed stream 432 for the compression adaptive module 402. The compression information can include bit rate information 446, quantization parameters 450 such as Q-steps, any other compression information, or combination thereof. The bit rate information 446 can also be provided by the parser module 428, either in combination with or alternatively to the decoder module 436, for the compression adaptive module 402.

The up-sampler module 444 can provide up-sampled input 456, to the compression adaptive module 402. The up-sampled input 456 can include up-sampled video, up-sampled audio, up-sampled multimedia, any other up-sampled data, or combination thereof. The compression adaptive module 402 restores, processes, maps, compares, extrapolates, interpolates, provides other improvements, or combination thereof, the up-sampled input 456 based at least in part on the extracted compression information including the bit rate information 446, the quantization parameters 450 such as Q-steps, any other compression information, or combination thereof.

The bit rate information 446, the quantization parameters 450, any other compression information, or combination thereof, can be directly associated with video quality of the stream 440. The compression adaptive module 402 provides an adaptive process for controlling a frequency lifting curve of a Frequency Lifting Super-Resolution (FLSR) technology such that lost detail frequency components are adaptively restored as a function of the degree of compression providing high quality internet videos with televisions such as Samsung televisions, the second display interface 306, any ultra high definition device, or combination thereof.

For example, the compression adaptive module 402 can restore lost video details with frequency lifting based on super-resolution technology, such as Frequency Lifting Super-Resolution (FLSR) technology, adaptive to the extracted or obtained compression information including the bit rate information 446, the quantization parameters 450, or combination thereof. The compression adaptive module 402 provides a high resolution output 460, such as a high quality internet video, that can be displayed on a high resolution display 464 such as the second display interface 240 of FIG. 2, the first display interface 230 of FIG. 2, or combination thereof. The details can be restored to the stream 440 by the compression adaptive module 402 for the high resolution output 460.

The compression adaptive module 402 can be coupled to the user interface module 408, the system operator module 412, the network interface module 416, the stream parser module 428, the decoder module 436, the up-sampler module 444, and the high resolution display 464. The compression adaptive module 402 can be implemented with the first control unit 212, the second control unit 234, the first storage unit 214, the second storage unit 246, or combination thereof.

The user interface module 408 can be coupled to the compression adaptive module 402, the system operator module 412, the network interface module 416, the stream parser module 428, the decoder module 436, the up-sampler module 444, and the high resolution display 464. The user interface module 408 can implemented with the first user interface 218, the second user interface 238, the first control unit 212, the second control unit 234, the first storage unit 214, the second storage unit 246, or combination thereof.

The system operator module 412 can be coupled to the compression adaptive module 402, the user interface module 408, the network interface module 416, the stream parser module 428, the decoder module 436, the up-sampler module 444, and the high resolution display 464. The system operator module 412 can be implemented with the first user interface 218, the second user interface 238, the first control unit 212, the second control unit 234, the first storage unit 214, the second storage unit 246, or combination thereof.

The network interface module 416 interface can be coupled to the compression adaptive module 402, the user interface module 408 the system operator module 412, the stream parser module 428, the decoder module 436, the up-sampler module 444, and the high resolution display 464. The network interface module 416 can be implemented with the first communication unit 216, the second communication unit 236, the first control unit 212, the second control unit 234, the first storage unit 214, the second storage unit 246, or combination thereof.

The stream parser module 428 can be coupled to the compression adaptive module 402, the user interface module 408, the system operator module 412, the network interface module 416, the decoder module 436, the up-sampler module 444, and the high resolution display 464. The stream parser module 428 can be implemented with the first communication unit 216, the second communication unit 236, the first control unit 212, the second control unit 234, the first storage unit 214, the second storage unit 246, or combination thereof.

The decoder module 436 can be coupled to the compression adaptive module 402, the user interface module 408, the system operator module 412, the network interface module 416, the stream parser module 428, the up-sampler module 444, and the high resolution display 464. The decoder module 436 can be implemented with the first communication unit 216, the second communication unit 236, the first control unit 212, the second control unit 234, the first storage unit 214, the second storage unit 246, or combination thereof.

The up-sampler module 444 can be coupled to the compression adaptive module 402, the user interface module 408, the system operator module 412, the network interface module 416, the stream parser module 428, the decoder module 436, and the high resolution display 464. The up-sampler module 444 can be implemented with the first control unit 212, the second control unit 234, the first storage unit 214, the second storage unit 246, or combination thereof.

It has been discovered that the electronic system 100 with the compression adaptive module 402 utilizing the compression features of the compressed streams 432 such as web or internet videos, with Frequency Lifting Super-Resolution (FLSR) provides image processing to uniquely improve video output and viewing quality. The compression adaptive module 402 utilizing the compression information or features of the web videos with Frequency Lifting Super-Resolution (FLSR) can significantly improve resolution and restore details for the high resolution output 460 of the compressed streams 432 for display on the high resolution display 464.

Figure 5:
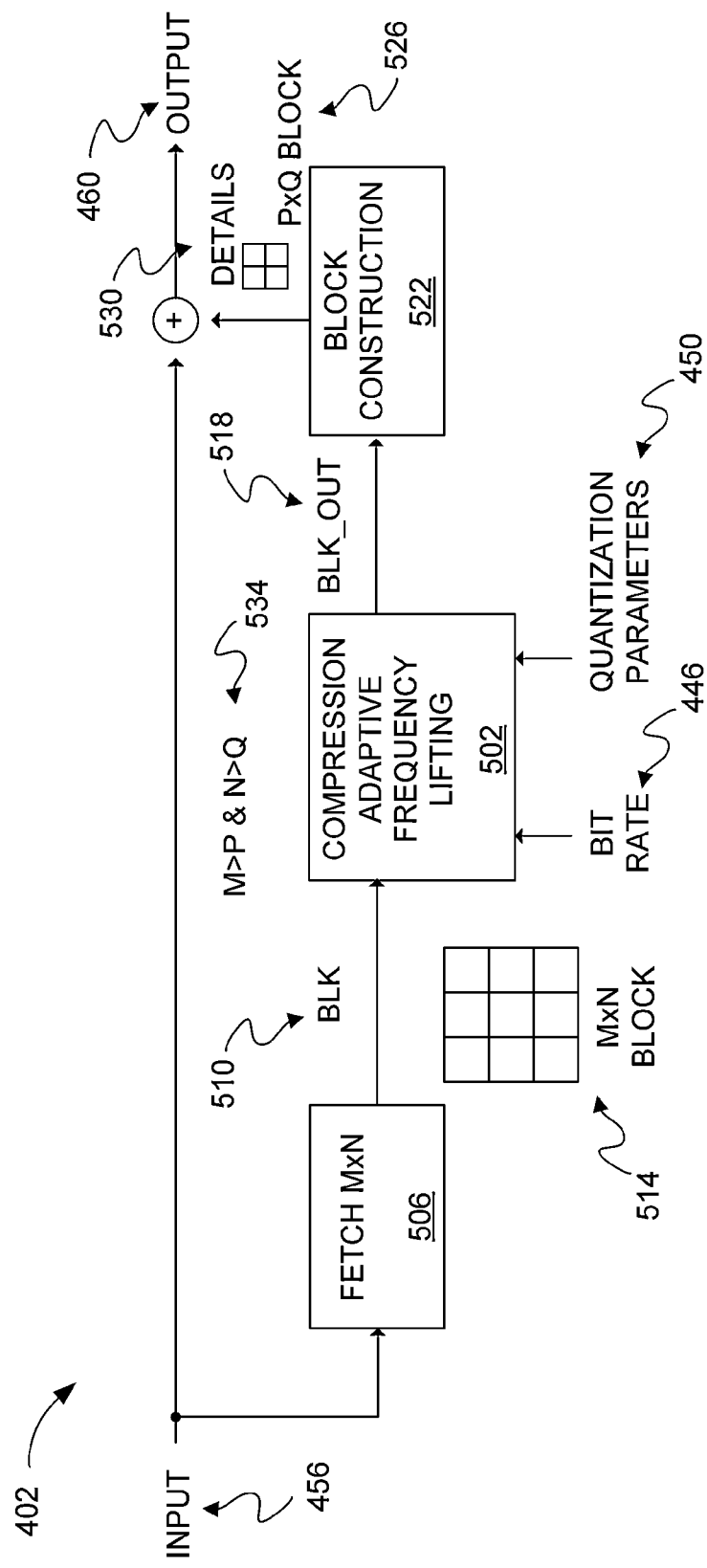
FIG. 5 is an exemplary control flow of the electronic system.

Referring now to FIG. 5, therein is shown an exemplary control flow 500 of the electronic system 100. The control flow 500 includes a compression adaptive frequency lifting module 502, such as a Compression Adaptive Frequency Lifting Super-Resolution module 502 or a CAFLSR module 502, of the compression adaptive module 402 of FIG. 4, such as the Compression Adaptive Detail Creation (CADC) module.

The compression adaptive frequency lifting module 502 can provide image detail creation based on compression adaptive frequency lifting with a Discrete Cosine Transform (DCT). A fetch module 506 such as a Block Fetch module, can provide a block 510 such as an image block or BLK, to the CAFLSR module 502 based on the up-sampled input 456 of FIG. 4. The fetch module 506 can divide an image in blocks 510 such as an M×N Block 514.

The compression adaptive frequency lifting module 502 creates a details block 518 such as a BLK_OUT, based on the bit rate information 446 of FIG. 4, the quantization parameters 450 of FIG. 4, any other compression information, or combination thereof. The bit rate information 446 of FIG. 4, the quantization parameters 450 of FIG. 4, any other compression information, or combination thereof, can be provided by the parser module 428 of FIG. 4, the decoder module 436 of FIG. 4, or combination thereof.

The details block 518 such as a BLK_OUT, can be provided to a block construction module 522 such as P×Q Block Construction module. The block construction module 522 can construct, create, extrapolate, interpolated, other processes, or combination thereof, a block image 526 such as a P×Q block with detail samples 530 from details block 518 such as the BLK_OUT of the M×N Block 514. The block image 526 such as the P×Q block and the detail samples 530 from details block 518 can be added, combined, integrated, any other operations, or combination thereof, with the up-sampled input 456 for the high resolution output 460. The block image 526 is typically smaller than the M×N Block 514, providing a higher resolution based on a size comparison 534 such as M>P & N>Q.

The compression adaptive frequency lifting module 502 can be coupled to the fetch module 506, the block construction module 522, the compression adaptive module 402, the user interface module 408 of FIG. 4, the system operator module 412 of FIG. 4, the network interface module 416 of FIG. 4, the stream parser module 428, the decoder module 436 of FIG. 4, the up-sampler module 444 of FIG. 4, and the high resolution display 464 of FIG. 4. The compression adaptive frequency lifting module 502 can be implemented with the first control unit 212, the second control unit 234, the first storage unit 214, the second storage unit 246, or combination thereof.

The fetch module 506 can be coupled to the compression adaptive frequency lifting module 502, the block construction module 522, the compression adaptive module 402, the user interface module 408, the system operator module 412, the network interface module 416, the stream parser module 428, the decoder module 436, the up-sampler module 444, and the high resolution display 464. The fetch module 506 can be implemented with the first control unit 212, the second control unit 234, the first storage unit 214, the second storage unit 246, or combination thereof.

The block construction module 522 can be coupled to compression adaptive frequency lifting module 502, the fetch module 506, the compression adaptive module 402, the user interface module 408, the system operator module 412, the network interface module 416, the stream parser module 428, the decoder module 436, the up-sampler module 444, and the high resolution display 464. The block construction module 522 can be implemented with the first control unit 212, the second control unit 234, the first storage unit 214, the second storage unit 246, or combination thereof.

It has been discovered that the electronic system 100 with the fetch module 506, the compression adaptive frequency lifting module 502 and the block construction module 522 of the compression adaptive module 402 creates the high resolution output 460 based on the bit rate information 446, the quantization parameters 450, the details block 518, the block image 526, the detail samples 530, or combination thereof.

Figure 6:
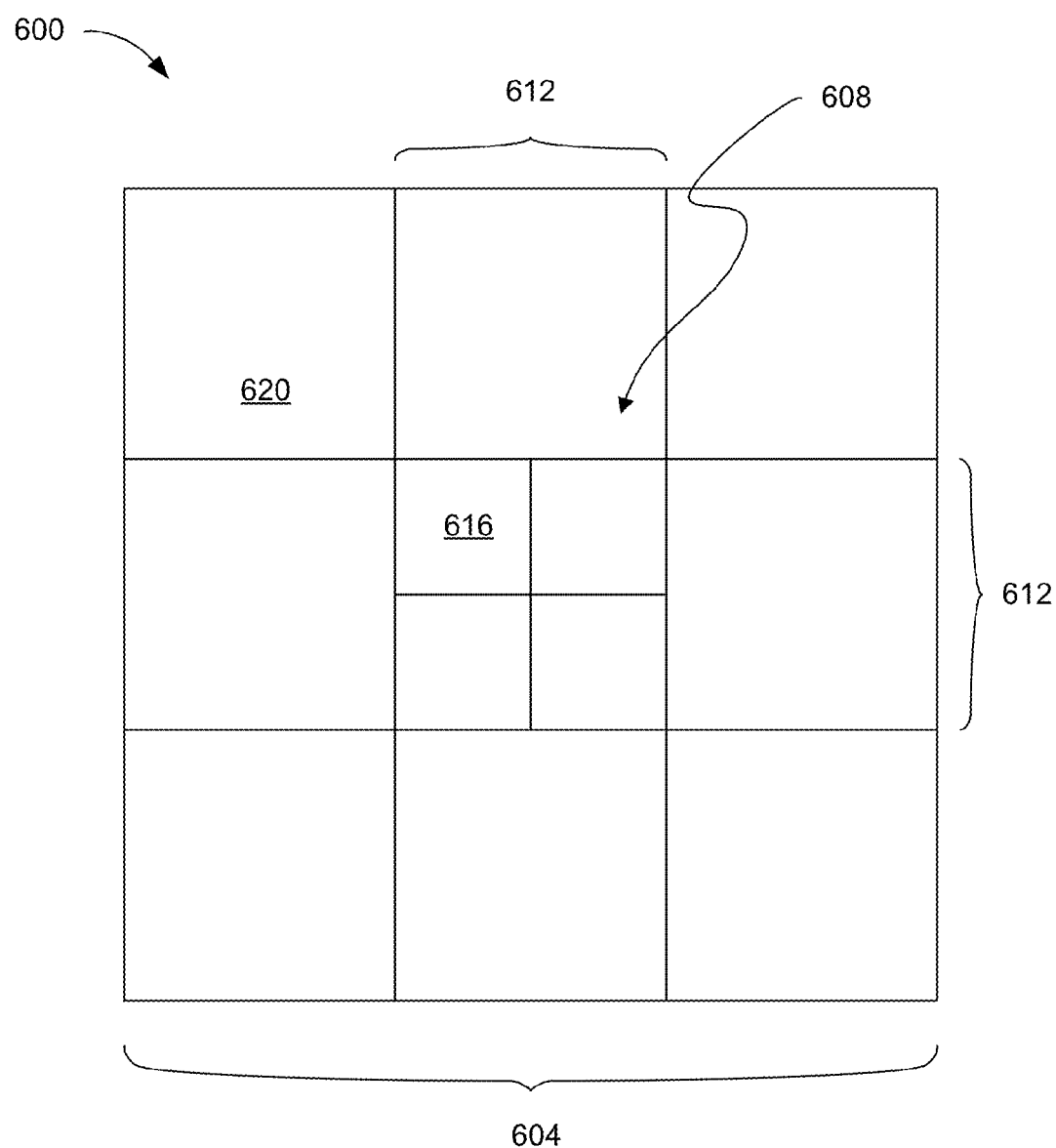
FIG. 6 is an exemplary diagram in a processing phase of the electronic system.

Referring now to FIG. 6, therein is shown an exemplary diagram 600 in a processing phase of the electronic system 100. The diagram 600 represents a spatial relationship between an input block 604 of the up-sampled input 456 of FIG. 4 and an output block 608 of the high resolution output 460 of FIG. 4.

For illustrated purposes, the output block 608 such as a constructed details block, is shown having a 2×2 block configuration although it is understood that the output block may be of any configuration. Exemplary configurations of the output block 608 can include 2×4, 4×4, or any configuration.

Further for illustrated purposes, the input block 604 such as a fetched block, is shown having a 6×6 block configuration although it is understood that the input block 604 may be of any configuration. Exemplary configurations of the input block 604 can include 8×8, 8×16, or any configuration.

Yet further for illustrated purposes, the output block 608 is shown located at center portions 612 of the input block 604 although it is understood that the output block 608 and the input block 604 may be in any location in any process phase. Examples of the location of the output block 608 and the input block 604 in process phases follow.

For example, during an output block processing phase, output block information 616 inside the output block 608 can be processed with input block information 620 outside the output block 608. The input block 604 such as an outer block and the output block 608 such as an inner block can be processed based on the output block information 616 related to the input block information 620.

As another example, during an output block creation phase, the output block information 616 of the output block 608 can be patched up to generate a whole of the high resolution output 460. The output block 608 such as the block image 526 of FIG. 5 such as the P×Q block, is typically smaller than the input block 604 such as the M×N Block 514 of FIG. 5, providing a higher resolution.

It has been discovered that the electronic system 100 with the output block 608 located at the center portions 612 of the input block 604 can be processed based on the output block information 616 related to the input block information 620.

Figure 7:
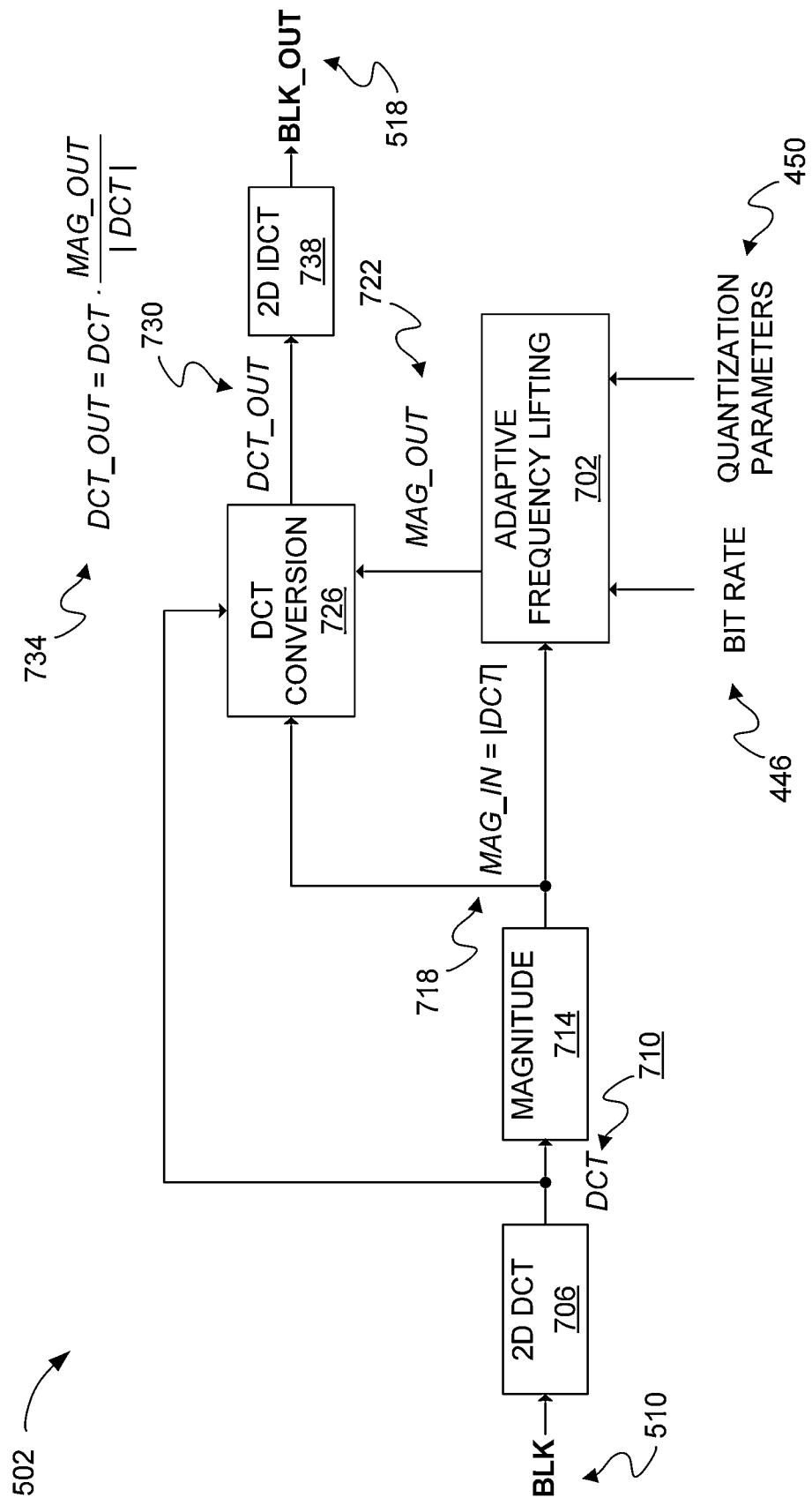
FIG. 7 is an exemplary control flow of the electronic system.

Referring now to FIG. 7, therein is shown an exemplary control flow 700 of the electronic system 100. The control flow 700 includes a compression adaptive frequency lifting module 702, of the compression adaptive frequency lifting module 502 of FIG. 5, the Compression Adaptive Frequency Lifting Super-Resolution module 502 or the CAFLSR module 502.

The block 510 such as an image block, BLK, or input image block, can be processed, received, computed, other operations, or combination thereof, by a Two Dimension Discrete Cosine Transform module 706 or a 2D DCT module 706. A sub-block (not shown) of the 2D DCT module 706 computes, processes, other operations, or combination thereof, a Discrete Cosine Transform (DCT) coefficient matrix 710. The DCT coefficient matrix 710 can be provided to a magnitude module 714.

The magnitude module 714 can provide a coefficient magnitude 718 such as MAG_IN=|DCT| to the compression adaptive frequency lifting module 702. The coefficient magnitude 718 can include the magnitude of the DCT MAG_IN, which is a M×N matrix composed of absolute values of the DCT matrix data represented by MAG_IN=|DCT|. The bit rate information 446 of FIG. 4, the quantization parameters 450 of FIG. 4, any other compression information, or combination thereof, can be provided to the compression adaptive frequency lifting module 702 by the parser module 428 of FIG. 4, the decoder module 436 of FIG. 4, or combination thereof.

The compression adaptive frequency lifting module 702 includes adaptive control of a frequency lifting process. The bit rate information 446, the quantization parameters 450, any other compression information, or combination thereof, provide the adaptive control of the frequency lifting process for a lifted Discrete Cosine Transform (DCT) magnitude 722 such as a MAG_OUT. The coefficient magnitude 718 such as MAG_IN, and the lifted DCT magnitude 722 such as MAG_OUT, can be provided to a Discrete Cosine Transform (DCT) conversion module 726.

The DCT conversion module 726 can output, calculate, process, or other operation, the Discrete Cosine Transform (DCT) output 730. The DCT output 730 can be provided with the DCT output formula 734 as follows:

$$\text{DCT\_OUT} = DCT \cdot \frac{\text{MAG\_OUT}}{\text{MAG\_IN}}$$

The DCT output 730 of the DCT conversion module 726 can combine original phase information with a magnitude change for a Two Dimension (2D) Inverse Discrete Cosine Transform (IDCT) module 738. The 2D IDCT module 738 can inversely transform the DCT output 730 to a spatial domain signal such as the details block 518. The spatial domain signal such as the details block 518 can have a configuration with a same size as the block 510, such as the M×N block 514 of FIG. 5, which can also be a same size as the detail samples 530 from details block 518.

The compression adaptive frequency lifting module 702 can be coupled to the 2D DCT module 706, the magnitude module 714, the DCT conversion module 726, the 2D IDCT module 738, the compression adaptive frequency lifting module 502, the fetch module 506 of FIG. 5, the block construction module 522 of FIG. 5, the compression adaptive module 402 of FIG. 4, the user interface module 408 of FIG. 4, the system operator module 412 of FIG. 4, the network interface module 416 of FIG. 4, the stream parser module 428 of FIG. 4, the decoder module 436 of FIG. 4, the up-sampler module 444 of FIG. 4, and the high resolution display 464 of FIG. 4. The compression adaptive frequency lifting module 702 can be implemented with the first control unit 212, the second control unit 234, the first storage unit 214, the second storage unit 246, or combination thereof.

The 2D DCT module 706 can be coupled to the compression adaptive frequency lifting module 702, the magnitude module 714, the DCT conversion module 726, the 2D IDCT module 738, the compression adaptive frequency lifting module 502, the fetch module 506, the block construction module 522, the compression adaptive module 402, the user interface module 408, the system operator module 412, the network interface module 416, the stream parser module 428, the decoder module 436, the up-sampler module 444, and the high resolution display 464. The 2D DCT module 706 can be implemented with the first control unit 212, the second control unit 234, the first storage unit 214, the second storage unit 246, or combination thereof.

The magnitude module 714 can be coupled to the compression adaptive frequency lifting module 702, the 2D DCT module 706, the DCT conversion module 726, the 2D IDCT module 738, the compression adaptive frequency lifting module 502, the fetch module 506, the block construction module 522, the compression adaptive module 402, the user interface module 408, the system operator module 412, the network interface module 416, the stream parser module 428, the decoder module 436, the up-sampler module 444, and the high resolution display 464. The magnitude module 714 can be implemented with the first control unit 212, the second control unit 234, the first storage unit 214, the second storage unit 246, or combination thereof.

The DCT conversion module 726 can be coupled to the compression adaptive frequency lifting module 702, the 2D DCT module 706, the magnitude module 714, the 2D IDCT module 738, the compression adaptive frequency lifting module 502, the fetch module 506, the block construction module 522, the compression adaptive module 402, the user interface module 408, the system operator module 412, the network interface module 416, the stream parser module 428, the decoder module 436, the up-sampler module 444, and the high resolution display 464. The DCT conversion module 726 can be implemented with the first control unit 212, the second control unit 234, the first storage unit 214, the second storage unit 246, or combination thereof.

The 2D IDCT module 738 can be coupled to the compression adaptive frequency lifting module 702, the 2D DCT module 706, the magnitude module 714, the DCT conversion module 726, the compression adaptive frequency lifting module 502, the fetch module 506, the block construction module 522, the compression adaptive module 402, the user interface module 408, the system operator module 412, the network interface module 416, the stream parser module 428, the decoder module 436, the up-sampler module 444, and the high resolution display 464. The 2D IDCT module 738 can be implemented with the first control unit 212, the second control unit 234, the first storage unit 214, the second storage unit 246, or combination thereof.

It has been discovered that the electronic system 100 with the compression adaptive frequency lifting module 702, the 2D DCT module 706, the magnitude module 714, the DCT conversion module 726, and the 2D IDCT module 738, provides a spatial domain signal such as the details block 518 with a configuration the same size as the block 510, the M×N block 514, the detail samples 530 of the details block 518, or combination thereof.

Figure 8:
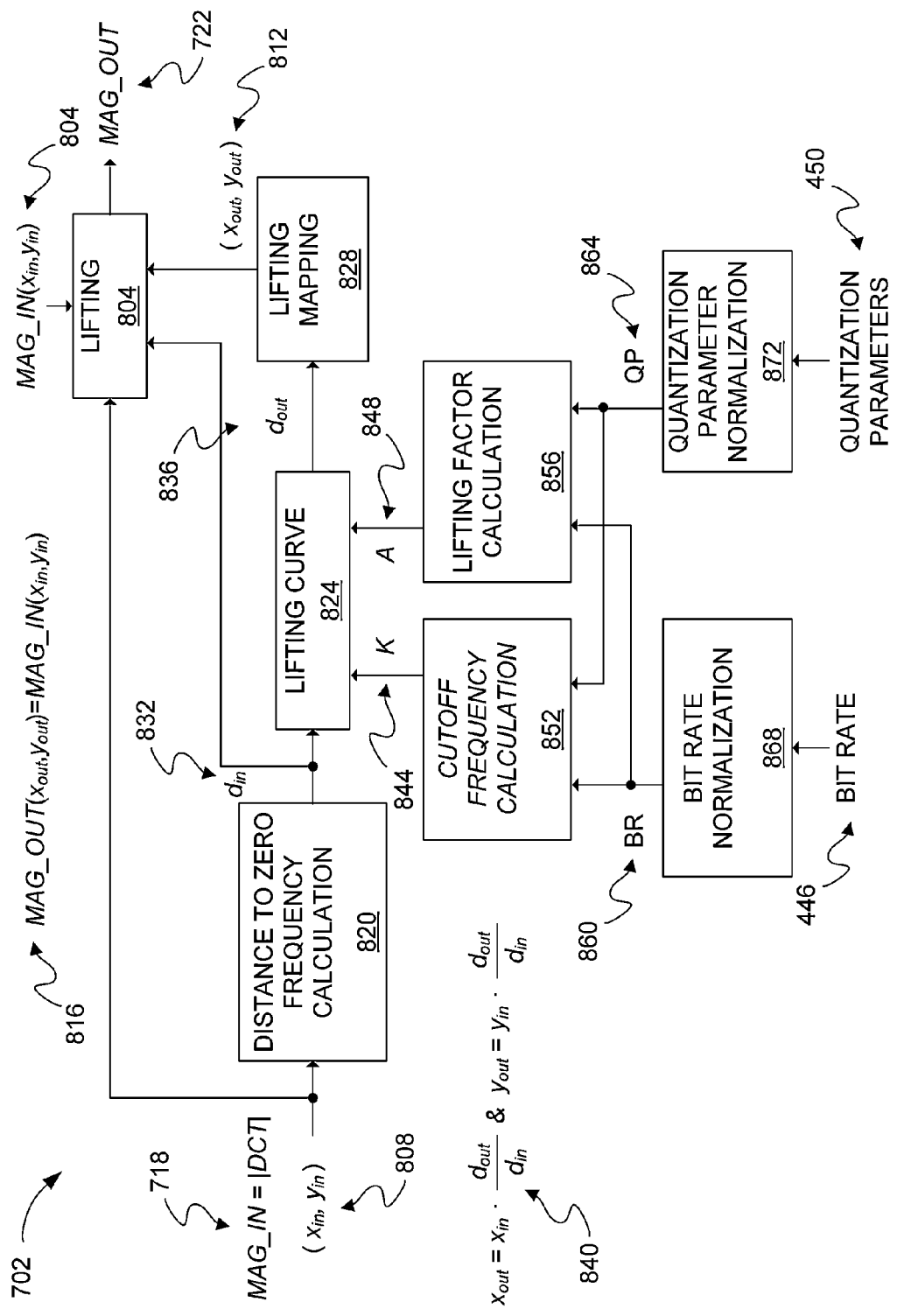
FIG. 8 is an exemplary control flow of the electronic system.

Referring now to FIG. 8, therein is shown an exemplary control flow 800 of the electronic system 100. The control flow 800 includes the compression adaptive frequency lifting (CAFL) module 702 of FIG. 7. The CAFL module 702 can shift frequency components to higher frequency positions based on a distance to a zero-frequency component adapted to the bit rate information 446 of FIG. 4 and the quantization parameters 450 of FIG. 4. The input frequency is lifted with generation of a lifted Discrete Cosine Transform (DCT) magnitude matrix directed away from a zero-frequency point. The input frequency lifting process can be controlled by the bit rate information 446 and the quantization parameters 450.

The CAFL module 702 can include a lifting module 802. The lifting module 802 can include an input magnitude 804 such as MAG_IN($x_{in}, y_{in}$). The input magnitude 804 can provide shifted or lifted frequency component information for the lifting module 802. The lifting module 802 can lift the coefficient magnitude 718 such as MAG_IN associated with ($x_{in}, y_{in}$) 808, to the lifted DCT magnitude 722 such as MAG_OUT associated with ($x_{out}, y_{out}$) 812, based on a Discrete Cosine Transform (DCT) magnitude equation 816 as follows:

$$\text{MAG\_OUT}(x_{out}, y_{out}) = \text{MAG\_IN}(x_{in}, y_{in})$$

The CAFL module 702 can also include a distance to zero module 820, a lifting curve module 824, and a lifting mapping module 828. The distance to zero module 820 can provide a distance input 832 such as $d_{in}$ to the lifting curve module 824 and the lifting module 802. The lifting curve module 824 can provide a distance output 836 such as $d_{out}$ to the lifting mapping module 828 based on the distance input 832, a frequency 844 such as a cutoff frequency K, a factor 848 such as a lifting factor A, or combination thereof.

The Discrete Cosine Transform (DCT) magnitude equation 816 can be associated with lifted coefficient magnitudes based on the lifting equations 840 as follows:

$$x_{out} = x_{in} \cdot \frac{d_{out}}{d_{in}} \ \& \ y_{out} = y_{in} \cdot \frac{d_{out}}{d_{in}}$$

The CAFL module 702 can also include a cutoff frequency module 852 for calculating, processing, providing, any other operation, or combination thereof, the frequency 844. Similarly, the CAFL module 702 can also include a lifting factor module 856 for calculating, processing, providing, any other operation, or combination thereof, the factor 848. The cutoff frequency module 852 and the lifting factor module 856 can receive, process, include, calculate, other operations, or combination thereof, a normalized bit rate 860 and a normalized quantization parameter 864.

A bit rate normalization module 868 can provide the normalized bit rate 860 based on the bit rate information 446 for the cutoff frequency module 852 and the lifting factor module 856. Similarly a quantization parameter normalization module 872 can provide the normalized quantization parameter 864 based on the quantization parameters 450 for the cutoff frequency module 852 and the lifting factor module 856.

The lifting module 802 can be coupled to the distance to zero module 820, the lifting curve module 824, the lifting mapping module 828, the cutoff frequency module 852, the lifting factor module 856, the bit rate normalization module 868, the quantization parameter normalization module 872, the compression adaptive frequency lifting module 702, the 2D DCT module 706 of FIG. 7, the magnitude module 714 of FIG. 7, the DCT conversion module 726 of FIG. 7, the 2D IDCT module 738 of FIG. 7, the compression adaptive frequency lifting module 502 of FIG. 5, the fetch module 506 of FIG. 5, the block construction module 522 of FIG. 5, the compression adaptive module 402 of FIG. 4, the user interface module 408 of FIG. 4, the system operator module 412 of FIG. 4, the network interface module 416 of FIG. 4, the stream parser module 428 of FIG. 4, the decoder module 436 of FIG. 4, the up-sampler module 444 of FIG. 4, and the high resolution display 464 of FIG. 4. The lifting module 802 can be implemented with the first control unit 212, the second control unit 234, the first storage unit 214, the second storage unit 246, or combination thereof.

The distance to zero module 820 can be coupled to the lifting module 802, the lifting curve module 824, the lifting mapping module 828, the cutoff frequency module 852, the lifting factor module 856, the bit rate normalization module 868, the quantization parameter normalization module 872, the compression adaptive frequency lifting module 702, the 2D DCT module 706, the magnitude module 714, the DCT conversion module 726, the 2D IDCT module 738, the compression adaptive frequency lifting module 502, the fetch module 506, the block construction module 522, the compression adaptive module 402, the user interface module 408, the system operator module 412, the network interface module 416, the stream parser module 428, the decoder module 436, the up-sampler module 444, and the high resolution display 464. The distance to zero module 820 can be implemented with the first control unit 212, the second control unit 234, the first storage unit 214, the second storage unit 246, or combination thereof.

The lifting curve module 824 can be coupled to the lifting module 802, the distance to zero module 820, the lifting mapping module 828, the cutoff frequency module 852, the lifting factor module 856, the bit rate normalization module 868, the quantization parameter normalization module 872, the compression adaptive frequency lifting module 702, the 2D DCT module 706, the magnitude module 714, the DCT conversion module 726, the 2D IDCT module 738, the compression adaptive frequency lifting module 502, the fetch module 506, the block construction module 522, the compression adaptive module 402, the user interface module 408, the system operator module 412, the network interface module 416, the stream parser module 428, the decoder module 436, the up-sampler module 444, and the high resolution display 464. The lifting curve module 824 can be implemented with the first control unit 212, the second control unit 234, the first storage unit 214, the second storage unit 246, or combination thereof.

The lifting mapping module 828 can be coupled to the lifting module 802, the distance to zero module 820, the lifting curve module 824, the cutoff frequency module 852, the lifting factor module 856, the bit rate normalization module 868, the quantization parameter normalization module 872, the compression adaptive frequency lifting module 702, the 2D DCT module 706, the magnitude module 714, the DCT conversion module 726, the 2D IDCT module 738, the compression adaptive frequency lifting module 502, the fetch module 506, the block construction module 522, the compression adaptive module 402, the user interface module 408, the system operator module 412, the network interface module 416, the stream parser module 428, the decoder module 436, the up-sampler module 444, and the high resolution display 464. The lifting mapping module 828 can be implemented with the first control unit 212, the second control unit 234, the first storage unit 214, the second storage unit 246, or combination thereof.

The cutoff frequency module 852 can be coupled to the lifting module 802, the distance to zero module 820, the lifting curve module 824, the lifting mapping module 828, the lifting factor module 856, the bit rate normalization module 868, the quantization parameter normalization module 872, the compression adaptive frequency lifting module 702, the 2D DCT module 706, the magnitude module 714, the DCT conversion module 726, the 2D IDCT module 738, the compression adaptive frequency lifting module 502, the fetch module 506, the block construction module 522, the compression adaptive module 402, the user interface module 408, the system operator module 412, the network interface module 416, the stream parser module 428, the decoder module 436, the up-sampler module 444, and the high resolution display 464. The cutoff frequency module 852 can be implemented with the first control unit 212, the second control unit 234, the first storage unit 214, the second storage unit 246, or combination thereof.

The lifting factor module 856 can be coupled to the lifting module 802, the distance to zero module 820, the lifting curve module 824, the lifting mapping module 828, the cutoff frequency module 852, the bit rate normalization module 868, the quantization parameter normalization module 872, the compression adaptive frequency lifting module 702, the 2D DCT module 706, the magnitude module 714, the DCT conversion module 726, the 2D IDCT module 738, the compression adaptive frequency lifting module 502, the fetch module 506, the block construction module 522, the compression adaptive module 402, the user interface module 408, the system operator module 412, the network interface module 416, the stream parser module 428, the decoder module 436, the up-sampler module 444, and the high resolution display 464. The lifting factor module 856 can be implemented with the first control unit 212, the second control unit 234, the first storage unit 214, the second storage unit 246, or combination thereof.

The bit rate normalization module 868 can be coupled to the lifting module 802, the distance to zero module 820, the lifting curve module 824, the lifting mapping module 828, the cutoff frequency module 852, the lifting factor module 856, the quantization parameter normalization module 872, the compression adaptive frequency lifting module 702, the 2D DCT module 706, the magnitude module 714, the DCT conversion module 726, the 2D IDCT module 738, the compression adaptive frequency lifting module 502, the fetch module 506, the block construction module 522, the compression adaptive module 402, the user interface module 408, the system operator module 412, the network interface module 416, the stream parser module 428, the decoder module 436, the up-sampler module 444, and the high resolution display 464. The bit rate normalization module 868 can be implemented with the first control unit 212, the second control unit 234, the first storage unit 214, the second storage unit 246, or combination thereof.

The quantization parameter normalization module 872 can be coupled to the lifting module 802, the distance to zero module 820, the lifting curve module 824, the lifting mapping module 828, the cutoff frequency module 852, the lifting factor module 856, the bit rate normalization module 868, the compression adaptive frequency lifting module 702, the 2D DCT module 706, the magnitude module 714, the DCT conversion module 726, the 2D IDCT module 738, the compression adaptive frequency lifting module 502, the fetch module 506, the block construction module 522, the compression adaptive module 402, the user interface module 408, the system operator module 412, the network interface module 416, the stream parser module 428, the decoder module 436, the up-sampler module 444, and the high resolution display 464. The quantization parameter normalization module 872 can be implemented with the first control unit 212, the second control unit 234, the first storage unit 214, the second storage unit 246, or combination thereof.

It has been discovered that the electronic system 100 with the lifting module 802, the distance to zero module 820, the lifting curve module 824, the lifting mapping module 828, the cutoff frequency module 852, the lifting factor module 856, the bit rate normalization module 868, and the quantization parameter normalization module 872, can lift the input frequency such as the block 510 or an image block with generation of a lifted Discrete Cosine Transform (DCT) magnitude matrix such as the lifted DCT magnitude 722 directed away from a zero-frequency point.

Figure 9:
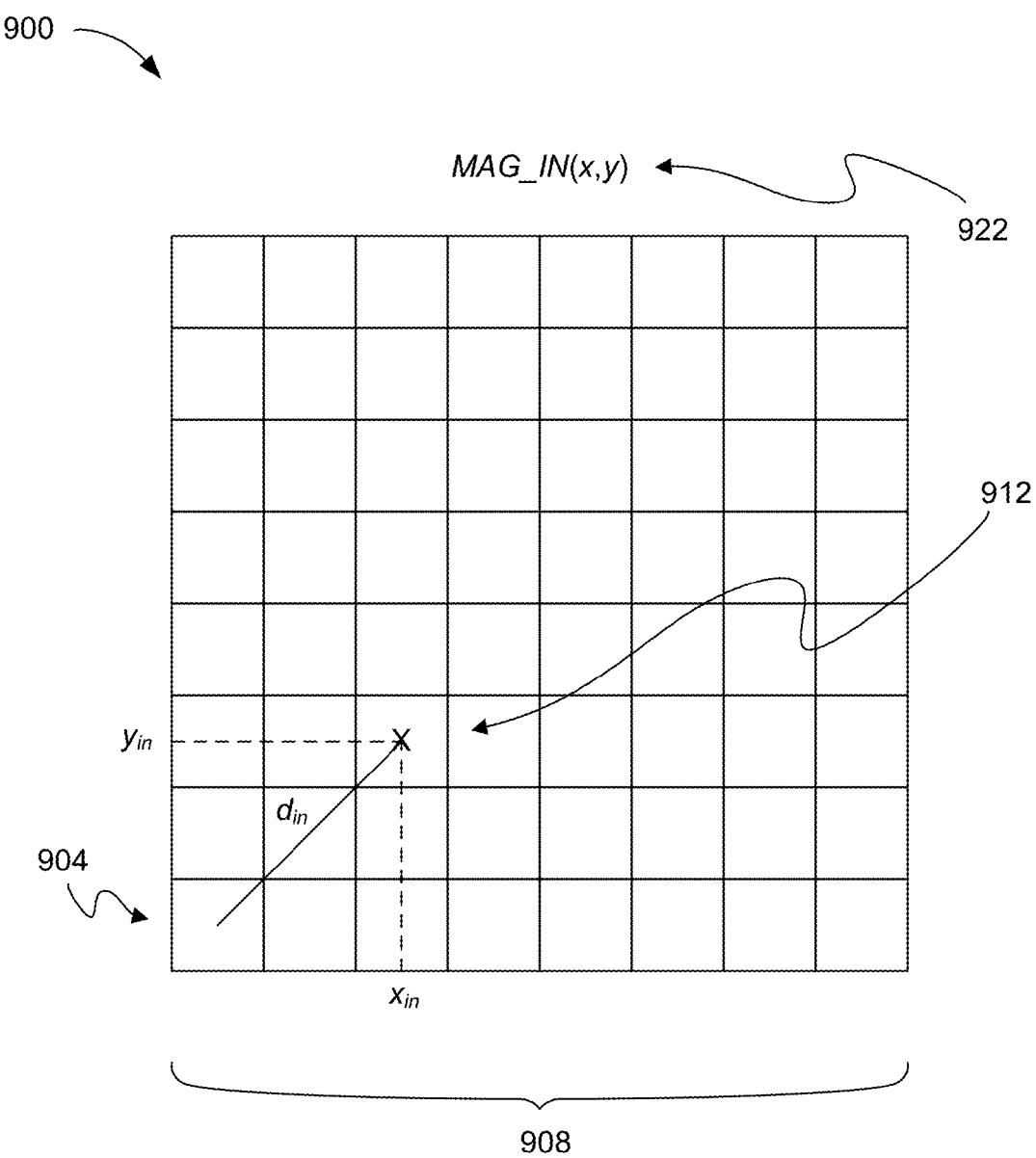
FIG. 9 is an exemplary diagram in a lifting phase of the electronic system.

Referring now to FIG. 9, therein is shown an exemplary diagram 900 in a lifting phase of the electronic system 100. The diagram 900 represents frequency lifting of the compression adaptive frequency lifting module 702 of FIG. 7.

The frequency lifting can include a distance calculated from a zero frequency point 904 such as an origin, for example (0,0) point of a two dimension (2D) coordinate system 908 with matrix elements as points 912 on the 2D coordinate system 908. Further for example, with M=N=8, the indices of MAG_IN 922 can become $x_{in}$=0, 1, ..., N-1 and $y_{in}$=0, 1..., M-1, as would MAG_OUT matrix indices. For all $x_{in}$=0, 1, ..., N-1 and $y_{in}$=0, 1, ..., M-1, the distance to a zero-frequency coefficient such as the zero frequency point 904 in the 2D coordinate system 908, can be calculated as follows:

$$d_{in} = \sqrt{x_{in}^2 + y_{in}^2}$$

A larger value of $d_{in}$ represents a higher frequency. The upper target lifting frequency distance to zero-frequency component can be represented as follows:

$$d_{out} = \text{curve}(d_{in})$$

where "curve" is a pre-determined transfer function as follows:

$$d_{out} = \begin{cases} d_{in}, & \text{if } d_{in} < K \\ \min(D_{max}, d_{in} + A \cdot (d_{in} - K) \cdot (D_{max} - d_{in}) \cdot T), & \text{otherwise} \end{cases}$$

where "T" is a pre-determined constant, K, that varies from $K_{min}$ to $K_{max}$, and A varies from $A_{min}$ to $A_{max}$. This curve can be plotted with an x/horizontal axis representing an input distance $d_{in}$ and a y/vertical axis representing an output distance $d_{out}$. When the input distance $d_{in}$ is smaller than a value K, the distance will not be changed. Therefore, the straight line has a slope of 1. However, when the input distance is larger than K, the output distance $d_{out}$ will be increased and larger than $d_{in}$.

The curve described in the transfer function above can be controlled primarily by two parameters, K and A. As K increases, a lower number of frequency components ($d_{in}$) are lifted, and as A decreases, the frequency components ($d_{in}$) are lifted a smaller distance. The overall frequency lifting can be adjusted based on combined values of the frequency 844 of FIG. 8 such as a cut off frequency K and the factor 848 of FIG. 8 such as a lifting factor A.

For example, a two dimension Discrete Cosine Transform (2D DCT) spectrum or system, can provide lower-frequency components such as matrix elements closer to a center, with a high value such as a magnitude of a Discrete Cosine Transform (DCT) component, than higher-frequency components. A lower-frequency component can be shifted to a higher-frequency position and high-frequency information will be created.

For illustrative purposes, a second order lifting curve has been described in this embodiment although it is understood that various extensions may be possible with different types of curves such as a piecewise linear curve, a sine curve, a cosine curve, any other curve, or combination thereof.

It has been discovered that the electronic system 100 with the compression adaptive frequency lifting module 702 can include various extensions with different types of curves including a piecewise linear curve, a sine curve, a cosine curve, any other curve, or combination thereof, to shift a lower-frequency component such as the block 510 of FIG. 5 to a higher-frequency position such as the details block 518 of FIG. 5.

Figure 10:
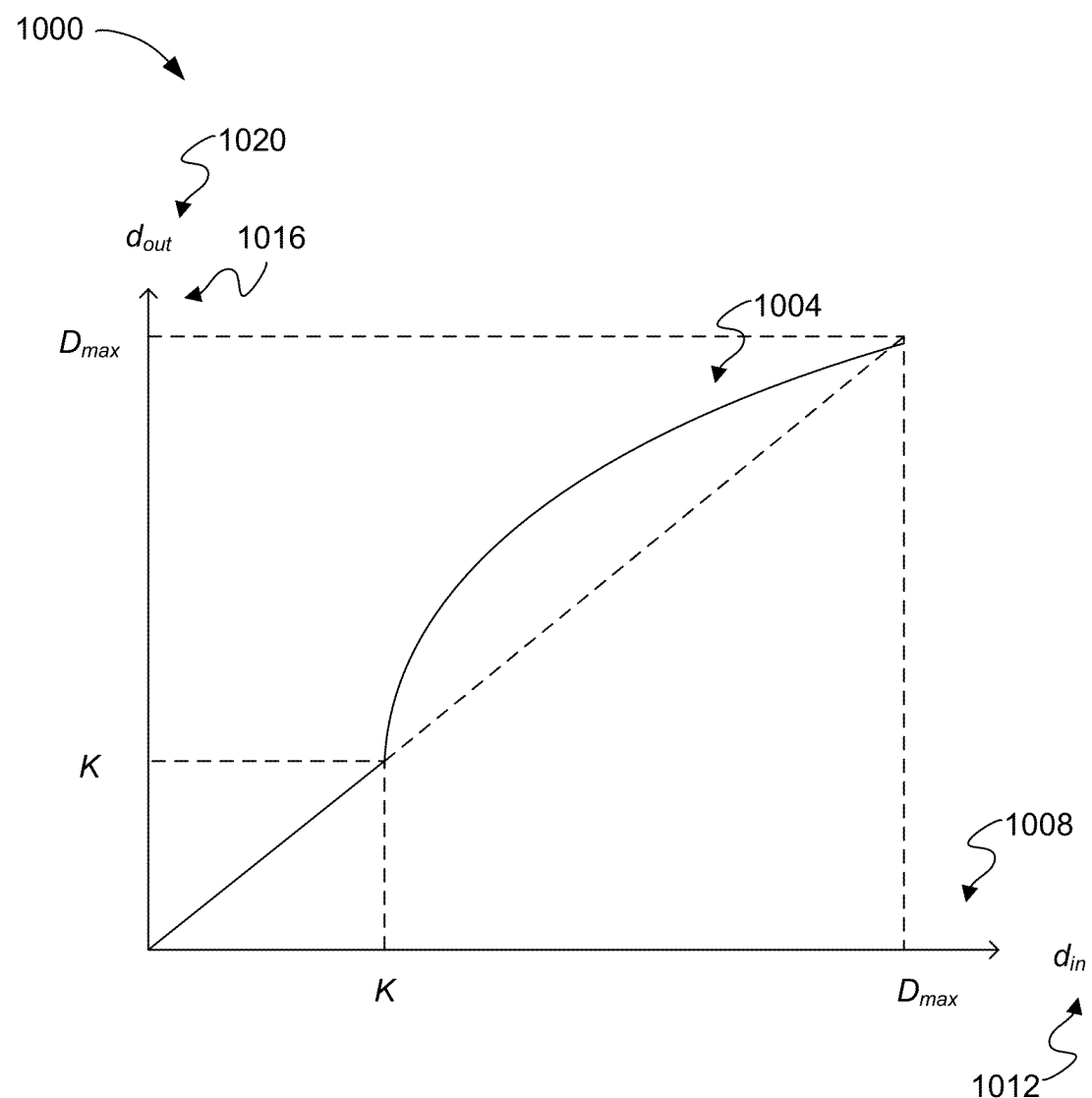
FIG. 10 is an exemplary graph in a normalization phase of the electronic system.

Referring now to FIG. 10, therein is shown an exemplary graph 1000 in a normalization phase of the electronic system 100. A curve 1004 is plotted with an x axis or a horizontal axis 1008 representing an input distance 1012 such as $d_{in}$ and a y axis or a vertical axis 1016 representing an output distance 1020 such as $d_{out}$.

When the input distance 1012 such as $d_{in}$ is smaller than a value K such as the frequency 844 of FIG. 8 or a cut off frequency K, a distance will not be changed since a straight line has a slope of 1. When the input distance 1012 is larger than K such as the frequency 844 or a cut off frequency K, the output distance 1020 such as $d_{out}$ will increase larger than the input distance 1012 such as $d_{in}$.

A systematic process to control a lifting curve such as the curve 1004 with the frequency 844 or a cut off frequency K and the factor 848 or a lifting factor A includes the normalized bit rate 860 of FIG. 8 or BR and the normalized quantization parameter 864 of FIG. 8 or QP. For illustrative purposes, the curve 1004 is shown as a linear curve it is understood that any curve may be used. For example, any monotonically increasing curve may be used.

It has been discovered that the electronic system 100 can control the curve 1004 with the frequency 844 and the factor 848 such that when the input distance 1012 is smaller than the frequency 844 the distance will not be changed and when the input distance 1012 is larger than the frequency 844 the output distance 1020 will increase larger than the input distance 1012.

Figure 11:
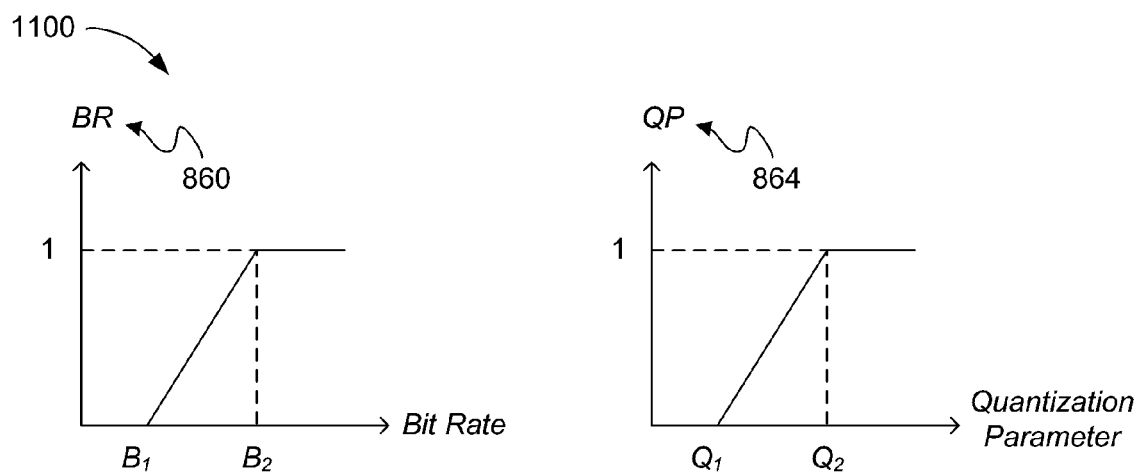
FIG. 11 is exemplary graphs in a parameter phase of the electronic system.

Referring now to FIG. 11, therein is shown exemplary graphs 1100 in a parameter phase of the electronic system 100. Detail loss can occur due to compression based on the normalized bit rate 860 of FIG. 8 or BR and the normalized quantization parameter 864 of FIG. 8 or QP.

Detail loss due to compression can occur in particular with a low value of the normalized bit rate 860. Similarly, detail loss due to compression can also occur in particular with a high value of the normalized quantization parameter 864. Boundary values for the normalized bit rate 860 and the normalized quantization parameter 864 can be expressed with the equation as follows:

$$\gamma = 1-(1-QP) \cdot BR$$

It has been discovered that the electronic system 100 provides <benefit(s)>. Please describe how the claimed elements give rise to this benefit.

Figure 12:
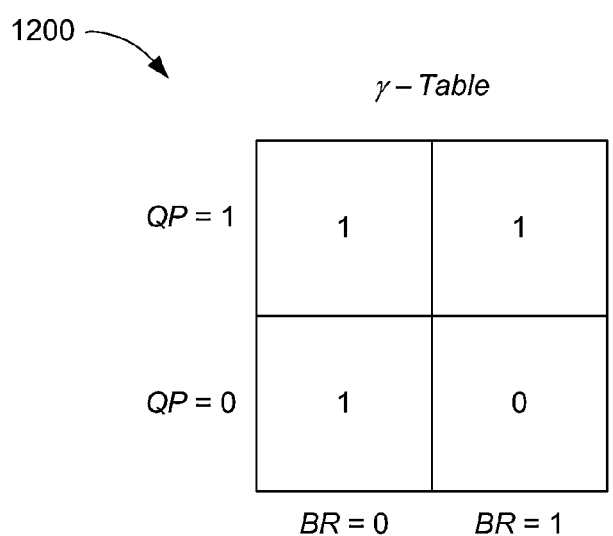
FIG. 12 is an exemplary table in a curve phase of the electronic system.

Referring now to FIG. 12, therein is shown an exemplary table 1200 in a curve phase of the electronic system 100. The table 1200 provides a table view of the above equation for $\gamma$ that indicates control of a lifting curve characterized by the normalized bit rate 860 and the normalized quantization parameter 864. As $\gamma$ increases, the lifting curve can be controlled by decreasing the value of the frequency 844 of FIG. 8 such as a cut off frequency K, increasing the value of the factor 848 such as a lifting factor A, or combination thereof, based on the following two equations:

$$K = K_{min} \cdot \gamma + K_{max} \cdot (1-\gamma)$$

and $$A = A_{max} \cdot \gamma + A_{min} \cdot (1-\gamma)$$

The values of K and A can both vary from $(K_{max}, A_{min})$ when $\gamma=0$ to $(K_{min}, A_{max})$ when $\gamma=1$. The electronic system 100 minimizes lifting in lightly compressed areas of an input such as a web video, and fully lifting a target frequency in heavily compressed areas includes adaptively controlling an (A,K) lifting curve based on the bit rate information 446 of FIG. 4, the quantization parameters 450 of FIG. 4 such as Q-steps, any other compression information, or combination thereof.

The target lifting factor can be adaptively adjusted by t and an associated horizontal and an associated vertical Discrete Cosine Transform (DCT) frequency component can be computed as follows:

$$x_{out} = x_{in} \cdot \frac{d_{out}}{d_{in}} \ \& \ y_{out} = y_{in} \cdot \frac{d_{out}}{d_{in}}$$

The DCT frequency components can be shifted into a same angle since $$\frac{y_{in}}{x_{in}} = \frac{y_{out}}{x_{in}}.$$

Target horizontal and vertical frequency components can be calculated and frequency components can be lifted from MAG_IN to MAG_OUT as follows:

$$\text{MAG\_OUT}(x_{out}, y_{out}) = \text{MAG\_IN}(x_{in}, y_{in})$$

The compression adaptive frequency lifting module 702 of FIG. 7 shifts each frequency component to a higher frequency location in a spectrum or system. The DCT coefficient matrix 710 of FIG. 7 from the 2D DCT module 706 of FIG. 7 can be plotted as a curved surface in a three dimension Cartesian coordinate system with an origin representing a zero-frequency position and a frequency lifting process can move off-center peaks outward from the origin as well as expanding a slope of a central peak outward.

It has been discovered that the electronic system 100 with the compression adaptive frequency lifting module 702 can move off-center peaks outward from the origin as well as expanding a slope of a central peak outward.

Figure 13:
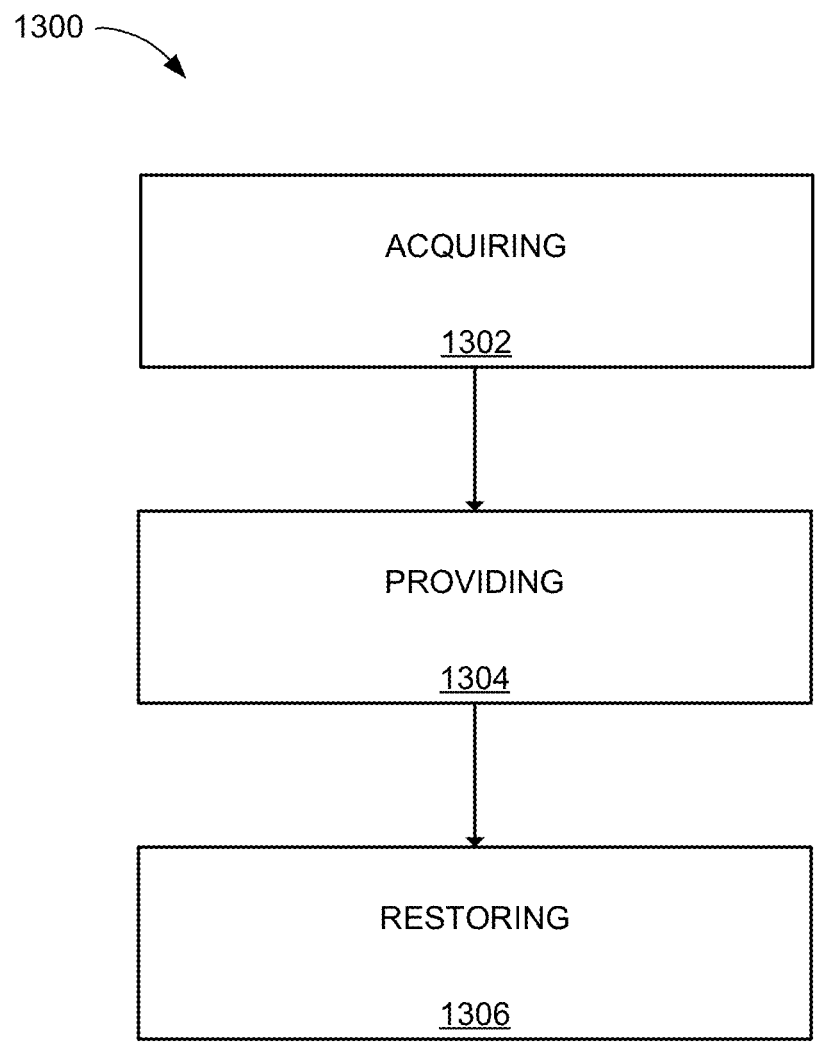
FIG. 13 is a flow chart of a method of operation of an electronic system in an embodiment of the present invention.

Referring now to FIG. 13, therein is shown a flow chart of a method 1300 of operation of an electronic system 100 in an embodiment of the present invention. The method 1300 includes: acquiring a transport stream in a block 1302; providing a stream from the transport stream in a block 1304; and restoring, with a control unit, details to the stream by a compression adaptive module for a high resolution output in a block 1306.

The modules described in this application can be implemented as instructions stored on a non-transitory computer readable medium to be executed by a first control unit 212 of FIG. 2, the second control unit 234 of FIG. 2, or a combination thereof. The non-transitory computer medium can include the first storage unit 214 of FIG. 2, the second storage unit 246 of FIG. 2, or a combination thereof. The non-transitory computer readable medium can include non-volatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or combination thereof. The non-transitory computer readable medium can be integrated as a part of the electronic system 100 or installed as a removable portion of the electronic system 100.

The modules described in this application can be part of the first software 226 of FIG. 2, the second software 242 of FIG. 2, or a combination thereof. These modules can also be stored in the first storage unit 214 of FIG. 2, the second storage unit 246 of FIG. 2, or a combination thereof. The first control unit 212, the second control unit 234, or a combination thereof can execute these modules for operating the electronic system 100.

The electronic system 100 has been described with module functions or order as an example. The electronic system 100 can partition the modules differently or order the modules differently. For example, the compression adaptive module 402 can include the compression adaptive frequency lifting module 502, the fetch module 506, and the block construction module 522 as separate modules although these modules can be combined into one. Also, the compression adaptive frequency lifting module 502 can be split into separate modules for implementing in the separate modules the compression adaptive frequency lifting module 702, the 2D DCT module 706, the magnitude module 714, the DCT conversion module 726, and the 2D IDCT module 738. Similarly the compression adaptive frequency lifting module 702 can be split into separate modules for implementing in the separate modules the lifting module 802, the distance to zero module 820, the lifting curve module 824, the lifting mapping module 828, the cutoff frequency module 852, the lifting factor module 856, the bit rate normalization module 868, and the quantization parameter normalization module 872.

The modules described in this application can be hardware implementation, hardware circuitry, or hardware accelerators in the first control unit 212 of FIG. 2 or in the second control unit 234 of FIG. 2. The modules can also be hardware implementation, hardware circuitry, or hardware accelerators within the first device 102 or the second device 106 but outside of the first control unit 212 or the second control unit 234, respectively.

The modules described in this application can be hardware implementation or hardware accelerators in the first control unit 212 of FIG. 2 or in the second control unit 234 of FIG. 2. The modules can also be hardware implementation or hardware accelerators within the first device 102 or the second device 106 but outside of the first control unit 212 or the second control unit 234, respectively.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
   a storage unit including a memory, configured to provide a decoded stream; and
   a control unit including a processor, coupled to the storage unit, configured to:
      calculate a discrete cosine transform (DCT) coefficient matrix from an image block based on the decoded stream;
      calculate a discrete cosine transform (DCT) magnitude with an adaptive process, based on a distance to zero-frequency component, for controlling a frequency lifting curve for a high resolution output; and
      generate a detailed block based on the product of the DCT coefficient matrix and a ratio of the DCT magnitude and a coefficient magnitude for generating a restored stream, wherein the coefficient magnitude is the absolute value of the DCT coefficient matrix data.

2. The system as claimed in claim 1 wherein the control unit is configured to calculate the DCT magnitude based on bit rate information.

3. The system as claimed in claim 1 wherein the control unit is configured to calculate the DCT magnitude based on a quantization parameter.

4. The system as claimed in claim 1 wherein the control unit is configured to provide a P×Q block from an M×N Block.

5. The system as claimed in claim 1 wherein the control unit is configured to inversely transform a Discrete Cosine Transform output.

6. The system as claimed in claim 1 wherein the control unit is configured to lift a magnitude.

7. The system as claimed in claim 1 further comprising a device, for displaying an image, configured to:
   acquire a transport stream;
   provide the decoded stream based on the transport stream; and
   generate the restored stream with a compression adaptive module for a high resolution output.

8. A method of operation of an electronic system comprising:
   providing a decoded stream;
   calculating a discrete cosine transform (DCT) coefficient matrix from an image block based on the decoded stream;
   calculating, with a control unit, a discrete cosine transform (DCT) magnitude with an adaptive process, based on a distance to zero-frequency component, for controlling a frequency lifting curve for a high resolution output; and
   generating a detailed block based on the product of the DCT coefficient matrix and a ratio of the DCT magnitude and a coefficient magnitude for generating a restored stream, wherein the coefficient magnitude is the absolute value of the DCT coefficient matrix data.

9. The method as claimed in claim 8 wherein calculating the DCT magnitude for a high resolution output is based on bit rate information.

10. The method as claimed in claim 8 wherein calculating the DCT magnitude for a high resolution output is based on a quantization parameter.

11. The method as claimed in claim 8 further comprising providing a P×Q block from an M×N Block.

12. The method as claimed in claim 8 further comprising inversely transforming a Discrete Cosine Transform output.

13. The method as claimed in claim 8 further comprising lifting a magnitude.

14. The method as claimed in claim 8 further comprising displaying the high resolution output on a high resolution display.

15. A non-transitory computer readable medium including stored thereon instructions to be executed by a control unit comprising:
   providing a decoded stream; and
   calculating a discrete cosine transform (DCT) coefficient matrix from an image block based on the decoded stream;
   calculating a discrete cosine transform (DCT) magnitude with an adaptive process, based on a distance to zero-frequency component, for controlling a frequency lifting curve for a high resolution output; and
   generating a detailed block based on the product of the DCT coefficient matrix and a ratio of the DCT magnitude and a coefficient magnitude for generating a restored stream, wherein the coefficient magnitude is the absolute value of the DCT coefficient matrix data.

16. The medium as claimed in claim 15 wherein calculating the DCT magnitude for a high resolution output is based on bit rate information.

17. The medium as claimed in claim 15 wherein calculating the DCT magnitude for a high resolution output is based on a quantization parameter.

18. The medium as claimed in claim 15 further comprising providing a P×Q block from an M×N Block.

19. The medium as claimed in claim 15 further comprising inversely transforming a Discrete Cosine Transform output.

20. The medium as claimed in claim 15 further comprising lifting a magnitude.

\* \* \* \* \*